Patented Oct. 18, 1938

2,133,702

UNITED STATES PATENT OFFICE 2,133,702

CONDENSATION COMPOSITION AND METHOD OF PREPARING SAME

Kenneth Harry Hoover, Terre Haute, Ind., assignor to Association of American Soap & Glycerine Producers, Inc., New York, N. Y., a corporation of Delaware No Drawing. Application February 6, 1935, Serial No. 5,245

8 Claims. (Cl. 260—8)

This invention relates to resinous condensation composition and to a process for the preparation of the same. More particularly, it is concerned with compositions containing glycerol ether polybasic acid resins and oleaginous modifying material and to the process whereby the incorporation of the oleaginous material with the resin may be accomplished as a step subsequent to and apart from the process steps producing the resin, and, consequently, in a manner subject to a nicety of control unattainable in processes heretofore employed.

The significance of this invention is more clearly understood when it is appreciated that the type of resin here involved, when modified with oil, may be incorporated in certain very useful compositions which the resin alone is totally unsuited for. Among these useful compositions are protective coatings, such as varnishes and paints.

Polyalcohol polybasic acid resins have heretofore been modified and made useful for such compositions by mixing a modifying oil with the ingredients which are then reacted to form the resin. Addition of the modifying oil subsequently to the formation of the resin has not heretofore been successfully effected. However, through this invention the unmodified resin may be manufactured in the manner desired and may be converted later into a variety of useful protective coating compositions.

In condensing a polyhydric alcohol, such as glycerol, with a polybasic acid, gelation occurs before the condensing action has been completed. It may be shown, in the condensation of glycerol with phthalic anhydride, which is an esterification reaction, that condensation is not more than 75 to 80% complete when gelation occurs. Upon reaching gelation, such an ester complex becomes insoluble in common organic solvents and in this condition is useless for the preparation of protective coatings.

Many expedients have been resorted to and some are in use by which solubility of such resins in common organic solvents may be retained and the usefulness of such resins established. Among these expedients are the use of simple monobasic acids or fatty oils in the condensation reaction. In employing these, copious quantities of the oil must be used or gelation will occur long before complete esterification and substantial neutralization is attained. Not only must large quantities of the oil be employed, but it must be added during the earlier stages of the reaction between the alcohol and the acid and ordinarily the oil is included as one of the initial reaction products.

The discovery of this invention, however, is based upon the fact that certain hard resinous ester complexes, such as described in my United States Patent No. 1,853,049, which are polyhydric alcohol cyclic ether polybasic acid reaction products may be completely synthesized and then treated with a modifying oil under proper conditions to produce compatible compositions which are soluble in common organic solvents. These resins will hereinafter at times be referred to as products of the condensation of cyclic ethers of polyhydric alcohols with polybasic acids.

According to this invention the finished glycerol ether resin which has been brought to a state of substantially complete esterification and consequently a state of low acidity is then treated with fatty oils for a proper length of time at a proper temperature, whereupon the fatty oils apparently enter into a new reaction with the resins and produce new products. This reaction probably involves ester interchange between the resinous ester complexes and the fatty oils. In other words, the modification of the resin with the oil is not purely a physical phenomenon, but involves a mutual chemical modification of the modifying agent and the resin. For this reason "drying" properties may be imparted to the resin by employing a drying oil, such as linseed oil or tung oil, as the modifying agent.

A further unique advantage of this invention lies in the fact that the hazard of gelation occurring, due to insufficient addition of modifying agent or the addition of the same at too late a time during the synthesis of the resin, is completely avoided inasmuch as the modifying of the resin according to this invention is carried on after the resin is completely formed. For this reason also, a wide range of proportions of resin and modifying agents may be employed and a far wider range of properties in the modified product obtained thereby. At the same time, closely related to these advantages is the further advantage that a mixture of resins may be modified according to this invention, a matter of prohibitive difficulty in the case where modification must attend synthesis of the resins.

In one form this invention may be practiced as follows: 1000 lbs. of a resin formed by the condensation of an esterifiable ether of glycerol and a cyclic body with a polybasic acid or its anhydride, such as the resins produced from phenyl, chlorophenyl, tolyl, or benzyl glyceryl ethers and phthalic anhydride and 100 lbs. of fatty oil, such as linseed, castor, cocoanut, cottonseed, hempseed, olive, palm, peanut, sperm, or tung oil are charged into a vessel provided with means for agitating the contents thereof. The vessel should be constructed of material inert with respect to the contents, an aluminum or glass-lined vessel being sometimes employed. The vessel is preferably covered, the cover being provided with a vent. The charged vessel is then brought rapidly to a temperature in the neighborhood of 260 degrees C. and the contents thoroughly agitated during the heating to bring about a uniform heating thereof. The contents of the vessel are heated and agitated until a drop of the material upon removal shows no sign of opacity upon cooling, indicating complete compatibility. If desirable, however, further heat, or heat and aeration, or other expedients may be employed, particularly in the case where drying oils form the modifying agent to bring about further bodying of the modified composition.

As an index of the length of time necessary to bring about a desired result, the following table is included, in which are shown the times for reaching compatibility of various cyclic glyceryl ether polybasic acid resins having varying acidity numbers when modified with varying proportions of various oils, when heating to a temperature in the neighborhood of 260 degrees C.:

| | Resin | Acid No. | Parts | Oil | Parts | Time necessary for compatibility, hours |
|---|---|---|---|---|---|---|
| 1 | Glyceryl tolyl ether phthalate resin (isomeric mixture). | 5.3 | 33 | Raw linseed | 67 | 3.5 |
| 2 | Do. | 5.3 | 50 | -----do------ | 50 | 4.5 |
| 3 | Do. | 5.3 | 67 | -----do------ | 33 | 6.0 |
| 4 | Glyceryl phenyl ether phthalate resin (isomeric mixture). | 8.9 | 50 | -----do------ | 50 | 3.0 |
| 5 | Glyceryl o-chloro phenyl ether phthalate resin (isomeric mixture). | 2.0 | 50 | -----do------ | 50 | 3.5 |
| 6 | Glyceryl tolyl ether phthalate resin (isomeric mixture). | 5.3 | 50 | Raw castor. | 50 | 0.5 |
| 7 | Glyceryl phenyl ether phthalate resin (isomeric mixture). | 8.9 | 50 | -----do------ | 50 | 0.5 |
| 8 | Glyceryl phenyl ether phthalate resin (isomeric mixture) (70%) Glyceryl diphenyl ether phthalate resin (isomeric mixture) (30%). | 3.7 | 50 | Raw linseed. | 50 | 4.0 |

Higher treating temperatures will result in shorter heating periods and lower treating temperatures result in longer heating periods.

The temperature of treatment, as indicated above, may be maintained in the neighborhood of 260 degrees C. The modifying action, however, proceeds in certain respects with temperatures as low as 150 degrees C., and the advantages of this invention may be obtained in part at least by operating at such low temperatures. The upper range of temperature is only limited by the resistance to pyrolysis of the material undergoing treatment. Temperatures as high as 310 degrees C., or higher, may be employed when proper precautions are observed to prevent the access of air and local overheating.

This invention may also be practiced by modifying the resin first with one modifying agent and later with another, for example, 127 parts of glyceryl phenyl ether, 98 parts of phthalic anhydride and 75 parts of resin may be heated together and this modified resin having an acid number of about 16.3 may then be treated with an equal weight of raw linseed oil at a temperature of about 260 degrees C., whereupon the composition will become compatible in about one hour.

According to this invention, substances other than the oils enumerated above may be used as modifying agents. In addition to the general class of oils, most of which are fatty in nature and consequently esters, the free fatty acids of such oils may be employed to produce somewhat similar products. The finished product naturally will be of correspondingly higher acidity than the initial glycerol ether resin taken for modification, but for specific purposes such modifying agents are at times useful.

In compounding resins according to this invention, sub-atmospheric or increased pressure may be advantageously employed at times. Also, it is possible to gain some advantage by excluding air through the use of an inert atmosphere and also, at times, by intentional aeration.

What I claim as my invention is:

1. The method of forming a modified resin which consists in placing glycerol phenyl ether phthalate resin and linseed oil in a vessel, raising the temperature of the vessel and its contents to about 260 degrees C. and maintaining the same at said temperature until a drop of the contents upon removing and cooling remains transparent.

2. The method of forming a modified resin which consists in placing glyceryl o-chloro phenyl ether phthalate resin and fatty oil in a vessel, raising the temperature of the vessel and its contents to a temperature of about 260 degrees C. and maintaining the same at said temperature until a drop of the contents upon removing and cooling remains transparent.

3. The method of forming a modified resin which consists in adding fatty oil to a previously formed unmodified resin which is a product of the condensation of an esterifiable glycerol monoether of a cyclic body with a phthalate forming substance, and uniformly heating the same at a temperature between 150 and 350 degrees C. until the modified resin remains transparent upon cooling.

4. The method of forming a modified resin which consists in adding fatty oil to a previously formed unmodified resin which is a product of the condensation of esterifiable glycerol monoether of a cyclic body with a phthalate forming substance, and uniformly heating the same to a temperature of about 260 degrees C. until the desired degree of compatibility is obtained.

5. The method of forming a modified resin which consists in adding fatty oils to a previously formed unmodified resin which is a product of the condensation of esterifiable glycerol monoether of a cyclic body with a phthalate forming substance, and heating the same to a temperature between 150 and 350 degrees C. until the desired degree of compatibility is obtained.

6. The method of forming a modified resin which consists in adding drying oil to a previously formed unmodified resin which is a product of the condensation of esterifiable glycerol mono-ether of a cyclic body with a phthalate forming substance, and heating the same uniformly to a temperature between 150 and 350 degrees C. until the desired degree of compatibility is obtained.

7. The method of forming a modified resin which consists in placing drying oil and a previously formed unmodified resin which is a product of the condensation of esterifiable glycerol mono-ether of a cyclic body with a phthalate forming substance in a vessel, heating the vessel and its contents to a temperature between 150 and 350 degrees C., passing air through the contents of the vessel to body the same, and continuing the heating and passage of air until the desired degree of bodying and compatibility is obtained.

8. The method of forming a modified resin which consists in adding a mixture of previously formed unmodified resins which are the product of the condensation of esterifiable glycerol mono-ethers of cyclic bodies with a phthalate forming substance to fatty oil, heating the mixture to a temperature between 150 and 350 degrees C., and continuing the heating until a drop of the mixture upon cooling remains transparent.

KENNETH HARRY HOOVER.